(12) United States Patent
Yungster

(10) Patent No.: US 11,012,744 B2
(45) Date of Patent: May 18, 2021

(54) SYSTEMS AND METHODS FOR EVALUATING THE ENGAGEMENT FACTOR OF VIDEOS

(71) Applicant: LongTail Ad Solutions, Inc., New York, NY (US)

(72) Inventor: Nir Yungster, Brooklyn, NY (US)

(73) Assignee: Longtail Ad Solutions, Inc., New York, NY (US)

( * ) Notice: Subject to any disclaimer, the term of this patent is extended or adjusted under 35 U.S.C. 154(b) by 0 days.

(21) Appl. No.: 16/353,224

(22) Filed: Mar. 14, 2019

(65) Prior Publication Data

US 2020/0296456 A1    Sep. 17, 2020

(51) Int. Cl.
*H04N 21/442* (2011.01)
*H04N 21/466* (2011.01)
*H04N 21/81* (2011.01)
*H04N 21/475* (2011.01)

(52) U.S. Cl.
CPC ... *H04N 21/44204* (2013.01); *H04N 21/4668* (2013.01); *H04N 21/4756* (2013.01); *H04N 21/812* (2013.01)

(58) Field of Classification Search
CPC ......... H04N 21/44204; H04N 21/4668; H04N 21/4756; H04N 21/812

USPC .......................................................... 725/14
See application file for complete search history.

(56) References Cited

U.S. PATENT DOCUMENTS

| | | | |
|---|---|---|---|
| 9,445,163 B2* | 9/2016 | Card, II | G06Q 30/0242 |
| 2010/0070992 A1* | 3/2010 | Morris | H04N 7/17336 |
| | | | 725/32 |
| 2010/0280876 A1* | 11/2010 | Bowra | G06Q 30/0242 |
| | | | 705/14.41 |
| 2011/0072448 A1* | 3/2011 | Stiers | H04N 7/17318 |
| | | | 725/10 |
| 2011/0288907 A1* | 11/2011 | Harvey | G06Q 30/02 |
| | | | 705/7.29 |
| 2013/0132989 A1* | 5/2013 | Han | H04N 21/25891 |
| | | | 725/14 |
| 2013/0247080 A1* | 9/2013 | Vinson | H04N 21/44213 |
| | | | 725/14 |
| 2016/0275833 A1* | 9/2016 | Forbes | G06K 9/00335 |
| 2017/0374402 A1* | 12/2017 | Pogorelik | H04N 21/84 |
| 2019/0141415 A1* | 5/2019 | Tegethoff | H04N 21/8455 |

\* cited by examiner

*Primary Examiner* — Ninenna N Ekpo
(74) *Attorney, Agent, or Firm* — FisherBroyles, LLP

(57) ABSTRACT

Systems and methods for generating a content score for a video that is indicative of how engaging the video is to viewers makes use of a modified completion rate factor. The modified completion rate factor indicates the percentage of viewers that played the video and that watched at least a predetermined number of second of the video. Other viewing factors may also be used to help generate the content score of the video.

22 Claims, 10 Drawing Sheets

US 11,012,744 B2

SYSTEMS AND METHODS FOR EVALUATING THE ENGAGEMENT FACTOR OF VIDEOS

BACKGROUND

In many instances, a website publisher who creates a website derives revenue not from use of the website, but rather from advertisers who place advertisements on the website. The advertisers pay the website publisher for the privilege of placing an advertisement on the publisher's website. The amount that the advertiser will pay to the website publisher depends, in part, on how many viewers typically visit the website in a given period of time. The greater the number of viewers, the more an advertiser is willing to pay to place an advertisement on the website. Likewise, the longer that individual viewers remain on the website during a visit, the more an advertiser is willing to pay to place an advertisement on the website.

In order to draw viewers to a website, and keep the viewers on the website, the publisher seeks to place content on the website that the publisher believes viewers will find interesting or engaging. That said, it is often difficult for a website publisher to know which content is likely to be engaging to viewers, and which content will be of little interest to viewers. Even when the website is dedicated to a single topic or theme, it can be difficult for the website publisher to know which content relating to that topic or theme is likely to be engaging to viewers.

Often a webpage will include multiple embedded video players, and each of the embedded video players is initially configured to play a different video. The viewer can then select one of the videos to be played. When the viewer finishes watching a first video using a first instantiation of a video player, the viewer could select a second video for play on a second instantiation of the video player. Also, the first instantiation of the video player, which initially was configured to play the first video, can be reconfigured to play a new video. Thus, as the viewer cycles through the videos, the content is constantly updated with new videos.

The website publisher can rely upon various video ratings or measures to select the content that is presented on the publisher's website. Such ratings are intended to indicate how engaging a video is to viewers. A video rating may be indexed in some fashion to provide an indication of the demographic that is likely to find the video engaging. For example, a video that men in their early 20 find engaging may be of little interest to women in their 60s.

Video ratings are typically established by monitoring viewer behavior for a testing period. Essentially, a ratings service will monitor viewer play behavior for an individual video over a period of time, and then use the acquired information to generate an engagement factor rating for the video.

Two of the metrics that are often used to generate an engagement factor rating for a video are the "view rate" and the "completion rate." The view rate is essentially what percentage of viewers that were given the option to play a particular video actually selected the video and played at least a portion of the video. The completion rate is essentially the percentage of viewers that selected the video for play, and then watched the video to substantial completion.

Unfortunately, the completion rate metric can be quite misleading. Different videos have different lengths. One video might only be 25 seconds long, whereas a second video is 8 minutes long. One would expect the completion rate for the first video to be relatively high because the first video has such a short duration. One would also expect the completion rate for the second video to be lower than the completion rate for the first video because of its long duration. As a result, it is somewhat unfair to compare the completion rates for two videos of differing lengths and automatically conclude that the first video is more engaging than the second video. What is needed is an engagement metric similar to the completion rate that accounts for the varying lengths of different videos.

DETAILED DESCRIPTION

Before turning to a detailed description of the invention, we will first establish the meaning of certain terms that will be used throughout the following description.

A media player software application may be referred to simply as a "video player", or just a "player." This is a software application that is responsible for playing videos to a viewer. A single webpage may include multiple instantiations of a video player, and a different video could be loaded into each instantiation of the video player.

A video could also be referred to a "media item." A media item could be a video or an audio clip.

A "content score" for a video is a value that is indicative of how interesting or engaging a video is believed to be to viewers. A content score could be expressed as a number, a percentage, a letter, as one of multiple different symbols, or in other ways, depending on the convention being used.

A content score could be generated using one or more "viewing factors," as will be described in more detail below. Each viewing factor assesses some aspect of the video that relates to how interesting or engaging the video is believed to be to viewers.

One of the aspects of viewer behavior that may be used to help generate a content score for a video is how many viewers watch the video to completion. The term "completion" in this regard does not mean that the viewer watched the video to the last second. It is common for the end of a video to include credits, references to the producer(s) of the video and other descriptive material. It is also common for a viewer to not watch this portion of a video, essentially cancelling or stopping play of the video when the descriptive portion at the end of the video begins to play. For purposes of the following description and for the appended claims, viewing a video to completion is intended to mean watching substantially all of the video, but not necessarily every second of the video. So long as a viewer watches substantially all of the video, we consider that the viewer watched the video to completion.

Figure 1:
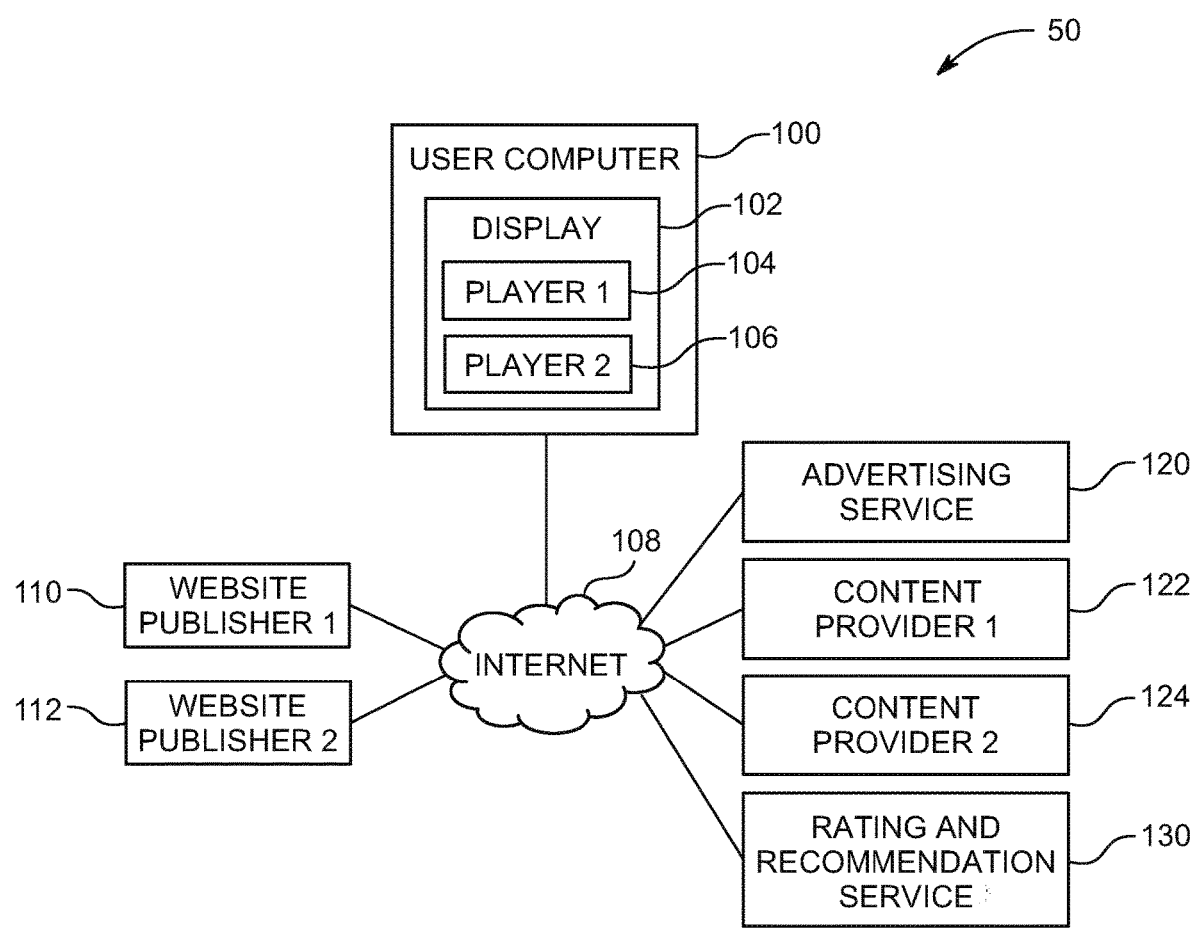
FIG. 1 is a diagram illustrating a communications environment in which systems and methods embodying the invention can be performed.

FIG. 1 illustrates a communications environment 50 in which viewers can watch videos. As shown in FIG. 1, a viewer's computing device 100 includes a display 102. An Internet browser software application loads and renders webpages of websites using information obtained from the Internet 108. In rendering a webpage, the browser could instantiate a first video player 104 and a second video player 106 that appear in separate windows in the webpage depicted on the display 102.

A first website publisher 110 and a second website publisher 112 provide websites that are accessible via the Internet 108. The website publishers 110/112 could host their websites on internal servers that are connected to the Internet 108. Alternatively, the website publishers could host their websites on cloud-based servers and memory devices that also are attached to the Internet 108. While only two website publishers 110/112 are illustrated in FIG. 1, those of ordinary skill in the art will appreciate that there are actually a very large number of website publishers that provide websites via the Internet 108.

An advertising service 120 connected to the Internet 108 can provide advertisements to websites. Those advertisements could include banner or display advertisements, as well as video advertisements. Often a website publisher 110/120 will enter into a contractual arrangement with an advertising service 120 under which an advertising service 120 provides advertisements to the websites created and maintained by the website publisher. The advertising service 120, in turn, enters into contractual arrangements with a variety of businesses that wish to place advertisements on websites. Thus, the advertising service 120 acts as a middleman between the website publishers and the advertising businesses. The advertising businesses pay the advertising service 120 to get their advertisements on websites, and the advertising service pays the website publishers 110/112 to place advertisements on the websites created and maintained by the website publishers.

A first content provider 122 and a second content provider 124 provide media items that can be displayed/played on websites created and maintained by the website publishers 110/112. For example, the first content provider 122 could provide a library of videos that relate to a first topic, for example sports. The second content provider 124 could provide a library of videos that relate to a different topic, such as nature videos. The website publishers 110/112 would pay the content providers 122/124 to play the videos the content providers 122/124 have in their respective libraries. While FIG. 1 only illustrates two content providers, those of ordinary skill in the art will appreciate that there are actually a very large number of content providers that provide all sorts of different media items.

A rating and recommendation service 130 may be part of a content provider, or the rating and recommendation service 130 could be a stand-alone entity. The rating and recommendation service 130 provides ratings and recommendations regarding videos to the website publishers 110/112. The ratings and recommendations could come in many forms. However, the ratings and recommendations are designed to provide information to the website publishers that they can use to place desirable videos on their websites.

The present application describes ways of generating a content score for a video that is intended to be indicative of how interesting or engaging the video is to viewers. The rating and recommendation service 130 would generate at least one content score for each of multiple videos. The website publishers then use the content score to help decide which videos to place on their websites.

In some instances, the rating and recommendation service 130 may generate multiple different content scores for a single video, with each content score being applicable to a different audience of viewers. For example, a first content score for a video may be indicative of how interesting and engaging the video is to men between the ages of 18 and 40. A second content score for the video could be indicative of how interesting and engaging the video is to men between the ages of 41 and 70. A third content score could be indicative of how interesting and engaging the video is for women between the ages of 18 and 35. A fourth content score could be indicative of how interesting the video is to women between the ages of 36 and 70.

Each of the four content scores mentioned above could be generated by monitoring the viewing behavior of viewers in the specified gender and age bracket, and then using information gathered while monitoring the viewing behavior to generate the content scores.

The rating and recommendation service 130 may also generate recommendations. For example, a recommendation could be that if a particular viewer appeared to like video X, then the same viewer will likely find videos A, B and C interesting. Armed with that recommendation, a website publisher could offer media item X on one of its webpages. If a viewer watches video X to completion, then the website could offer to play the viewer videos A, B and C. Thus, the recommendations could be used to setup a playlist for a particular instantiation of a video player. Such recommendations might also be used in real time to respond to what a particular viewer seems to find interesting.

Figure 2:
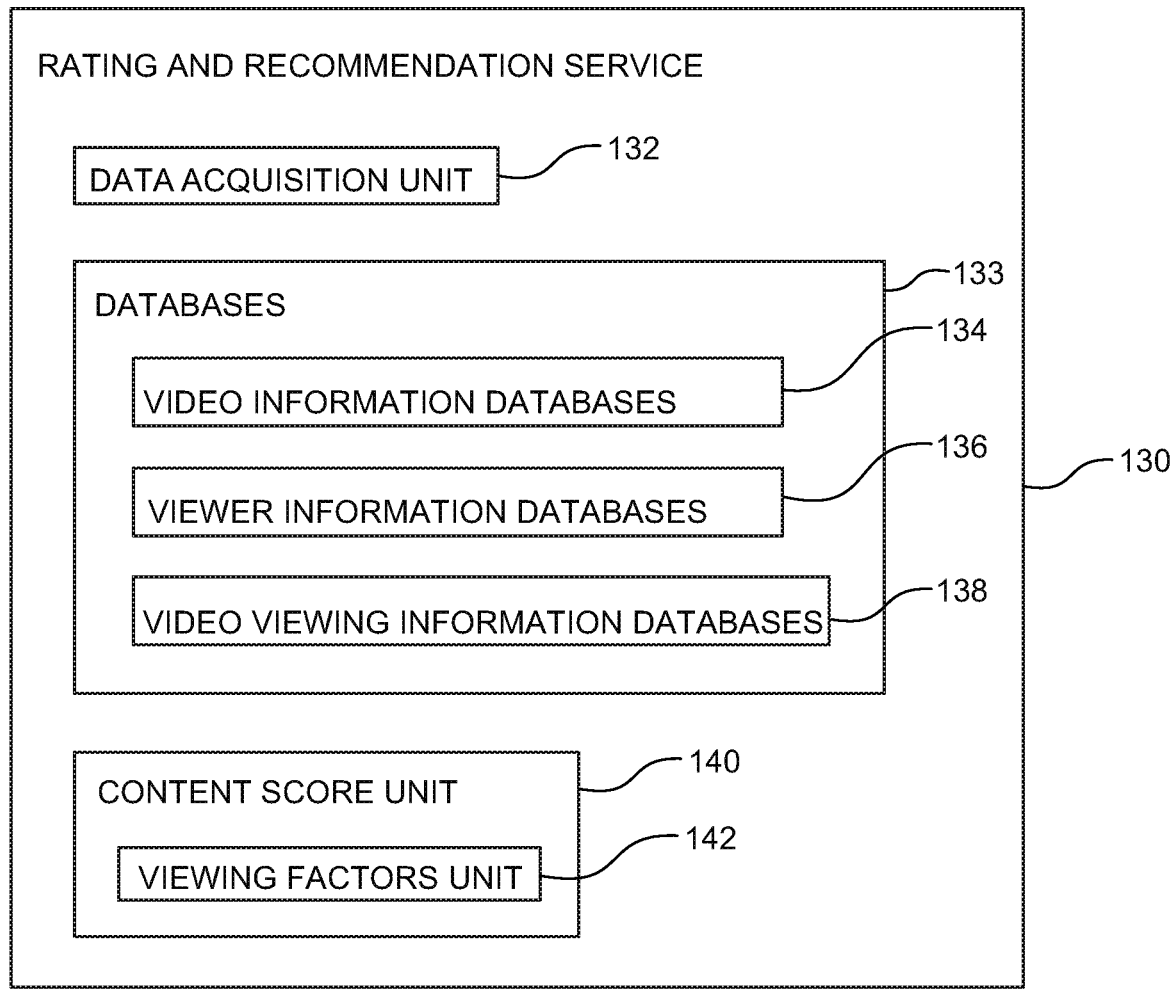
FIG. 2 is a diagram of selected elements of a rating and recommendation service.

With the above background, we will now discuss the elements of a rating and recommendation service 130, as illustrated in FIG. 2. The rating and recommendation service 130 includes a data acquisition unit 132 that obtains information about viewer behavior when viewers watch a video. This information is typically reported by the instantiation of a video player 104/106 that is playing the video. The reported information can include a URL associated with the webpage the viewer is viewing, the title of the video, a description of the video, a transcript of the video, the bit rate at which the video is being played, the size of the video player on the viewer's screen, the percentage of the video player that is viewable to the viewer, the location of the video player on the viewer's screen, the definition at which the video is being played, the volume level, the language setting, the time that was spent buffering data before the video began to play, information about how much of the video is played before the viewer stops or cancels play of the video, as well as a variety of other information. The information reported to the data acquisition unit 132 might also include information about a referring webpage or agent that caused the viewer to navigate to the webpage where the video is played. The reported information could also include information about the viewer's computer, such as the operating system, the browser that is in use, and possibly the geographical location of the computer, which may be based on the IP address currently assigned to the viewer's computer.

In some instances, information about a video that is played by a video player 104/106 may be provided to the data acquisition unit 132 not by the video player 104/106, but rather by a publisher of the video, or some third-party information source. For example, descriptions of the videos and transcripts of videos may be recorded in a database in advance. When the viewer plays a video, the title of the video is sent from the video player 104/106 to the data acquisition unit 132. The ratings and recommendation service can then use the title of the video to look up information about the video.

The data acquisition unit 132 may also acquire information about the viewer. Although the rating and recommendation service 130 may not know the actual identity of the viewer, the viewer may be identifiable via a viewer name or code assigned by the rating and recommendation service 130 itself. As a result, each time that a viewer goes back to view another video, the viewer's viewing history can be updated with additional information. Over time, the viewer's viewing history can be used to build a profile for the viewer. And once the viewer's preferences are determined, the rating and recommendation service can provide website publishers with video recommendations that are tailored to an individual viewer's tastes and preferences.

Also, even if a new viewer's tastes and preferences are not yet known, the ratings and recommendation service may be able to identify a viewer as belonging to a certain class of viewer, based on things like the type of the viewer's computing device, the operating system in use on the viewer's computing device, the viewer's geographical location, and various other factors. Having identified the viewer as belonging to a certain class of viewer, it is then possible to begin to provide recommendations to the viewer that mirror recommendations made to other viewers in the same class of viewer.

The data acquisition unit 132 may also obtain information about viewer behavior from various other sources. For example, a website that offers videos may also track viewer behavior and report that viewer behavior to the rating and recommendation service 130.

The data acquisition unit 132 may also obtain information about the videos themselves from various sources. For example, the data acquisition unit 132 may obtain information about videos from the content providers 122/124 that provide the videos to the website publishers 110/112. The data acquisition unit 132 may also obtain information about videos from various other sources, and possible from other rating and recommendation services.

The rating and recommendation service 130 also includes databases 133. The databases can include a database of video information 134, which is information about individual videos. the content scores generated by the rating and recommendation service 130 may be one of the items of data stored for each video in the video information databases 134. A variety of other information about individual videos is also stored in the video information databases, such as the subject or topic of the video, its duration or length, whether the video is happy or sad, as well as other information.

The databases 133 can also include viewer information databases 136 which hold information about individual viewers. As noted above, the actual identities of the viewers may not be known. However, to the extent the rating and recommendation service is able to identify individual viewers, information about the viewers is stored in the viewer information databases 136. This can include a list of the videos that the viewer has watched, information about how long they watched each video, information about the sequence in which the viewer watched the videos, information about which websites the viewer commonly uses, as well as other information.

The viewer information databases may store information that is calculated or generated based on observing viewer behavior over an extended period of time. For example, some viewers may tend to watch all or most videos to completion, whereas other viewers may tend to never watch most videos to completion. Individual viewers typically will have an affinity for certain subjects, topics or themes, and that information may also be stored in the viewer information databases. Also, information about the time of day and day of week that the viewer tends to watch videos, and which type of videos the viewer plays at various different times may also be tracked and recorded in the viewer information databases.

The databases 133 also include video viewing information databases that store information about viewer behavior when individual videos were watched. For example, for a particular video, the video viewing information databases may store information about how much of a video each viewer played before cancelling or stopping play of the video. The information recorded may also include information about the viewer. For example, the information could indicate that a viewer who likes the subject of the video played the video for only 10 seconds before cancelling play. This could indicate the video is not particularly engaging, even for viewers that are interested in the subject of the video. Alternatively, the information could indicate that a viewer who has no affinity for the subject of the video watched the video to completion. This could indicate that the video is highly engaging, even to viewers that are not interested in the topic of the video.

The video viewing information databases might also include information about whether and how often a single viewer replayed a particular video. The recorded information may also indicate that when the viewer replayed a video, only a portion of the video was replayed, and the portion that was replayed could be identified.

The information stored in the video viewing information databases could be complied over time and summarized in the databases. For example, the information could indicate that for all viewers that have an affinity for the subject of the video, 80% of the viewers with an affinity for the subject or topic of the video watched the video to completion. Or the information could indicate that for all viewers that tend to watch videos to completion, only 20% of the long attention span viewers watched the video to completion. Thus, the information in the video viewing information databases could be computed and stored in a summary fashion.

When the video player 104/106 is not configured to automatically play a video when the viewer lands on a webpage containing the video player, information about how often a viewer clicks the play button when the viewer has the option to do so. This could be expressed as the percentage of viewers that had the option to play a video, and actually did so. Similarly, a percentage of the number of viewers that were recommended a video and then played the video may be tracked.

A plurality of fields in a video's record of a database could be used to track how much of the video viewers tend to watch. For example, one field could record the percentage of viewers that make it to the 10 second mark, a second field could record the percentage of viewer that make it to the 30 second mark, etc. A field of a video's database record may also record the fraction of the total video that viewers tend to watch.

If a viewer watches a video and is then presented with one or more recommendations for another video to watch, information about how often the viewer chooses to watch one of the recommendations may be recorded.

Information about how many videos a viewer tends to watch during each session may be recorded in a database of viewer information. Likewise, the total amount of time that a viewer watches per session may be recorded and used to generate averages for the viewer. Similarly, the number of videos a viewer watches per day and/or per week may be recorded and used to generate averages for the viewer.

Information about a viewer's viewing habits that is collected may be filtered before any of the information is used to generate averages or computed values for the viewer. For example, when calculating an average for a viewer, the ratings and recommendation service 130 may first filter out and discard any viewing data that was generated when the video player was not visible to the viewer, or when the video player was muted. The remaining data would then be used to calculate an average value.

The rating and recommendation service 130 also includes a content score unit 140. As will be described in more detail below, the content score unit uses the information in the databases 133 to generate at least one content score for each video being tracked. The content score is intended to be indicative of how interesting or engaging the video is to viewers. As noted above, the content score unit 140 may generate multiple content scores for each video, where each content score is indicative of how interesting or engaging the video is to a different segment of the viewing public.

The content score unit 140 includes a viewing factors unit 142. The viewing factors unit 142 calculates one or more viewing factors that may be used to generate a content score for a video. A viewing factor may be representative of whether a certain segment of the viewing public finds the video particularly engaging, or particularly un-engaging. Such viewing factors can be quite helpful in determining the content score that should be generated for the video.

Although some elements of the rating and recommendation service 130 are discussed above, a rating and recommendation service 130 may include many other elements. Likewise, a rating and recommendation service 130 may not include all of the elements listed above and shown in FIG. 2.

Figure 3:
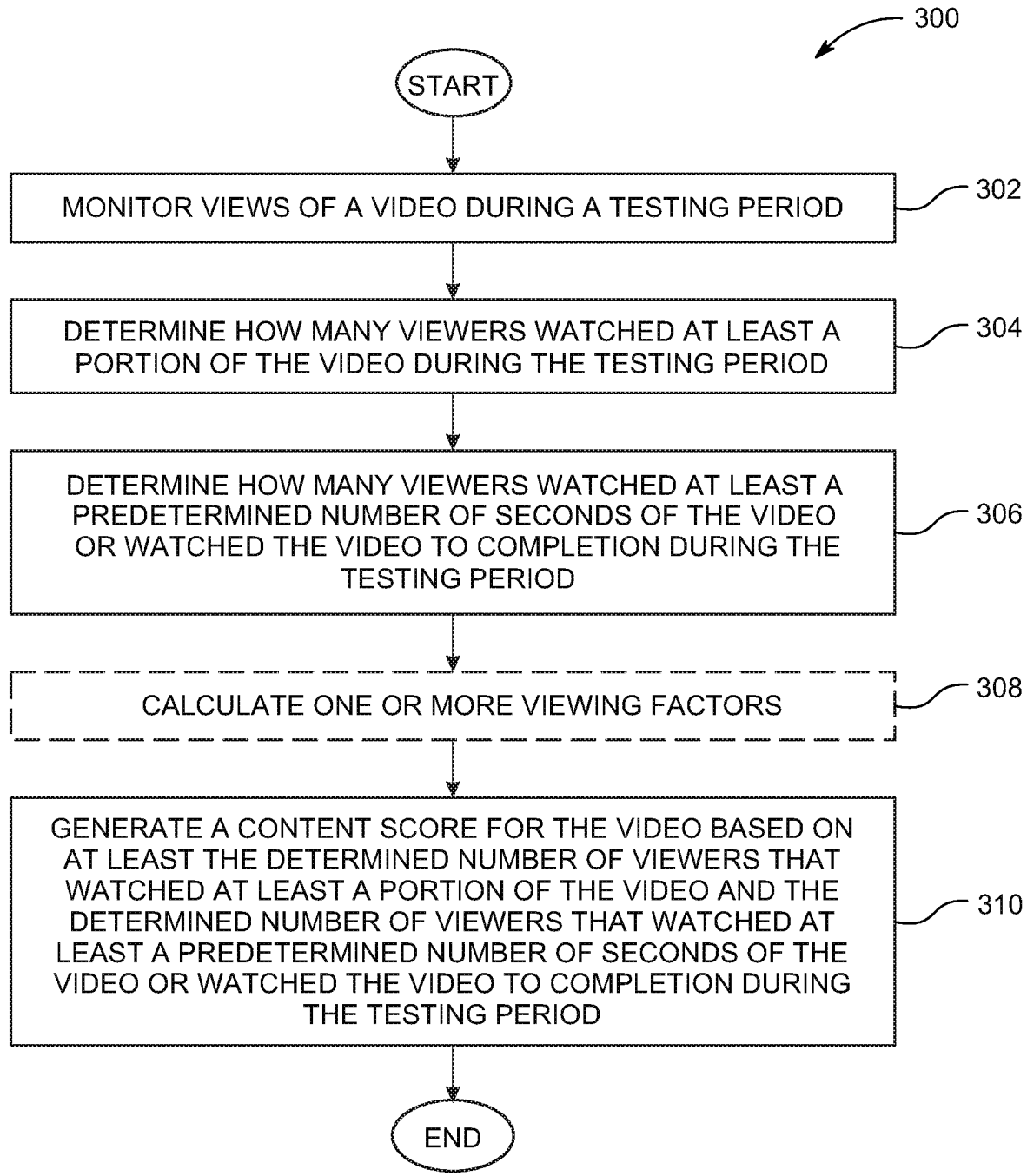
FIG. 3 is a flowchart illustrating steps of a method of generating a content score for a video.

FIG. 3 illustrates steps of a method of generating a content score for a video. The method 300 begins and proceeds to step 302, where the data acquisition unit 132 of a rating and recommendation service monitors views of the video by viewers during a testing period. Typically, this information would be reported to the data acquisition unit 132 by the video player software applications that play the video on a webpage. However, in some instances, the data acquisition unit 132 may obtain this information from other sources, such as the website publishers.

At a minimum, the data acquisition unit 132 will learn how many seconds of the video each viewer watched. However, additional information may also be acquired. For example, the volume level, the definition level at which the video played, the size of the player on the viewers screen and various other viewing conditions may also be reported to the data acquisition unit 132. This information is stored in the video viewing information databases 138.

In many instances, the data acquisition unit 132 will learn the identity of the viewer. If the identity of a viewer is known, information about the actions of the viewer may be stored in the viewer information databases 136. For example, if the same viewer watches the videos that he chooses to play to substantial completion, this information is used to identify the viewer as a long attention span viewer. Conversely, if the viewer tends to watch only a small portion of most videos that the viewer chooses to play, this information is used to identify the viewer as a short attention span viewer. Thus, the viewer's conduct while playing the video can be helpful for reasons that are explained below.

Once information about views of the video during the testing period have been acquired, the method proceeds to step 304 where the number of viewers that watched at least a portion of the video during the testing period is determined. The method then proceeds to step 306 where the number of viewers that watched at least a predetermined number of seconds of the video during the testing period is determined. The predetermined number of seconds could be 30 seconds, or some other length of time. The length of the video may have an effect on value of the predetermined number of seconds. If the video is less than the predetermined number of seconds long, and the viewer watched substantially all of the video, then the view is treated as if the viewer watched the predetermined number of seconds.

Step 308 is an optional step where one or more viewing factors are determined using information about views of the video during the testing period. Details of some such viewing factors are discussed below.

The method then proceeds to step 310, where a content score is determined for the video. The content score is based, at least in part, on the number of viewers that watched at least a portion of the video during the testing period, and the number of viewers that watched at least the predetermined number of seconds of the video, or watched the video to substantial completion, during the testing period. In some embodiments, the content score could be expressed as a number that is the number of viewers that watched at least the predetermined number of seconds of the video, or watched the video to substantial completion, divided by the total number of viewers that watched at least a portion of the video. The method then ends.

As explained above, the content score is intended to represent how interesting or engaging the video is to viewers. Rather than using a traditional "completion rate" to judge how engaging the video is, the content score only tests for whether the video captured the viewers' interest for the predetermined number of seconds.

The traditional completion rate score for videos tends to be higher for short videos and lower for longer videos. The content score generated in step 310 of this method, which only determines if the video captured viewers' attention for the predetermined number of seconds, helps to correct for the inherent bias that creeps into the traditional completion rate score for videos of varying length.

The predetermined number of seconds used in this method may be adjusted based on the length of the video being tested. If the video is quite short, the predetermined number of second may be relatively small. If the video is quite long, the predetermined number of seconds could be made longer.

The predetermined number of seconds could be adjusted quite significantly based on the expected behavior for the relevant viewing audience. For example, for short videos played on a website, thirty seconds may be a good a relevant duration to use. However, for television programs and movies, thirty seconds would be much too short a duration to indicate customer engagement.

As mentioned above, optional step 308 of the method illustrated in FIG. 3 involves calculating one or more viewing factors. In some embodiments, no viewing factors are calculated, and the content score is based only the number of viewers that watched at least a portion of the video during the testing period, and the number of viewers that watched the predetermined number of seconds of the video during the testing period. However, when a viewing factor is calculated, it will be taken into account and used to help generate the content score for the video.

Figure 4:
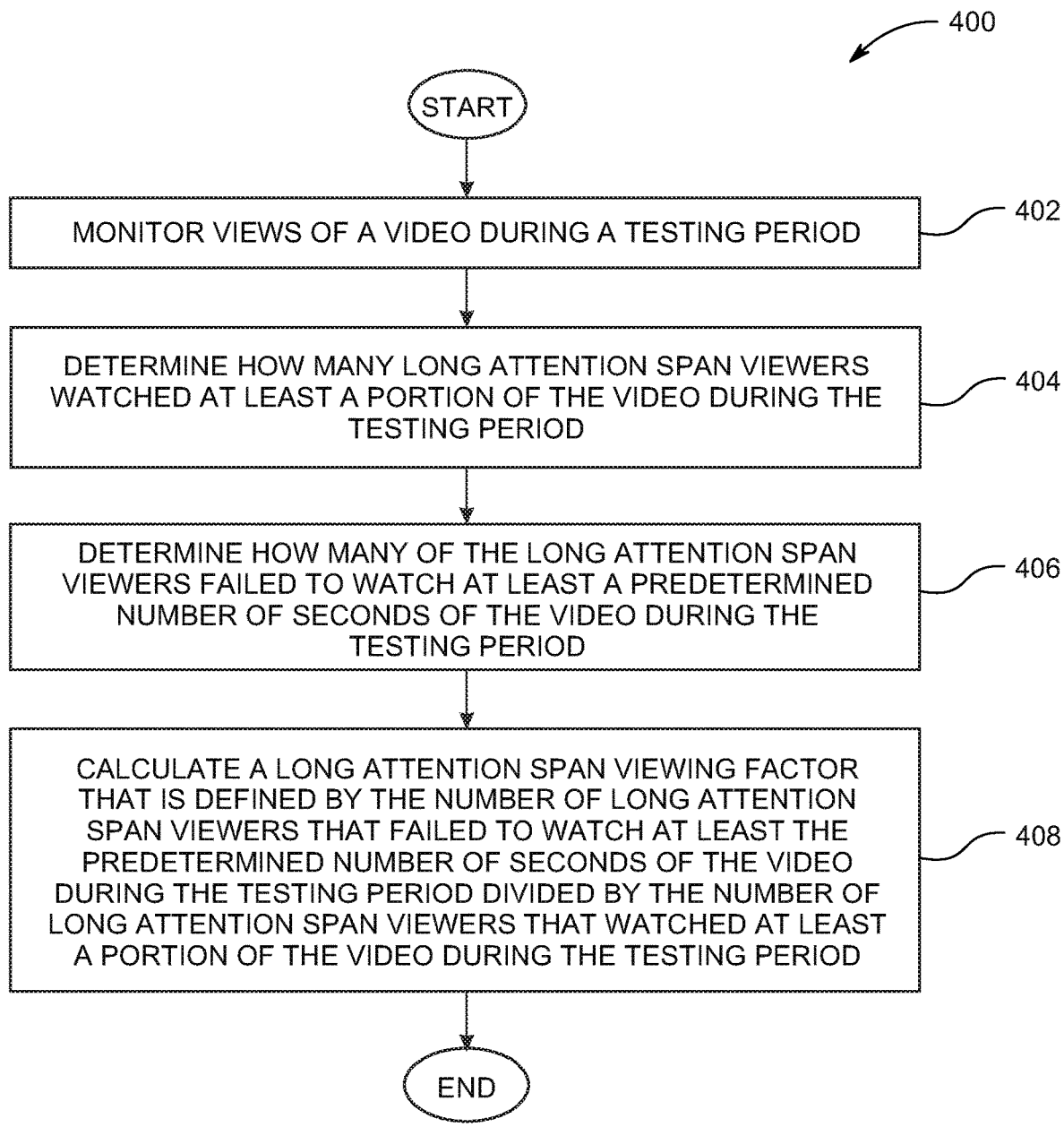
FIG. 4 is a flowchart illustrating steps of a method of calculating a first viewing factor for a video that can be used to help generate a content score for the video.

FIG. 4 illustrates steps of a method of calculating a long attention span viewing factor. The method 400 begins and proceeds to step 402, where views of the video during the testing period are monitored. This step can be done in parallel with the monitoring step 302 of the method illustrated in FIG. 3. In this instance, however, we are only paying attention to the viewing behavior of long attention span viewers.

As mentioned above, it is possible for the rating and recommendation service 130 to identify individual viewers, and to acquire information about their viewing behavior. In doing so, the rating and recommendation service can flag some viewers that typically watch videos to substantial completion as long attention span viewers. Likewise, the rating and recommendation service 130 can flag viewers that do not tend to watch videos to completion as short attention span viewers.

In step 404, the number of long attention span viewers that watched at least a portion of the video during the testing period is determined. In step 406, the number of long attention span viewers that failed to watch the predetermined number of seconds of the video is determined. In step 408, a long attention span viewing factor is determined. The long attention span viewing factor is defined as the number of long attention span viewers that failed to watch at least the predetermined number of seconds of the video during the testing period divided by the number of long attention span viewers that watched at least a portion of the video during the testing period. The method then ends.

If a long attention span viewer fails to watch the predetermined number of seconds of the video, this can indicate that the video is not interesting or engaging, even to long attention span viewers. As a result, a high value for the long attention span viewing factor will be used to adjust the content score for the video downward.

The predetermined number of seconds used in performing the method illustrated in FIG. 4 can be the same as the predetermined number of seconds used in the method illustrated in FIG. 3, or the number could be different.

Figure 5:
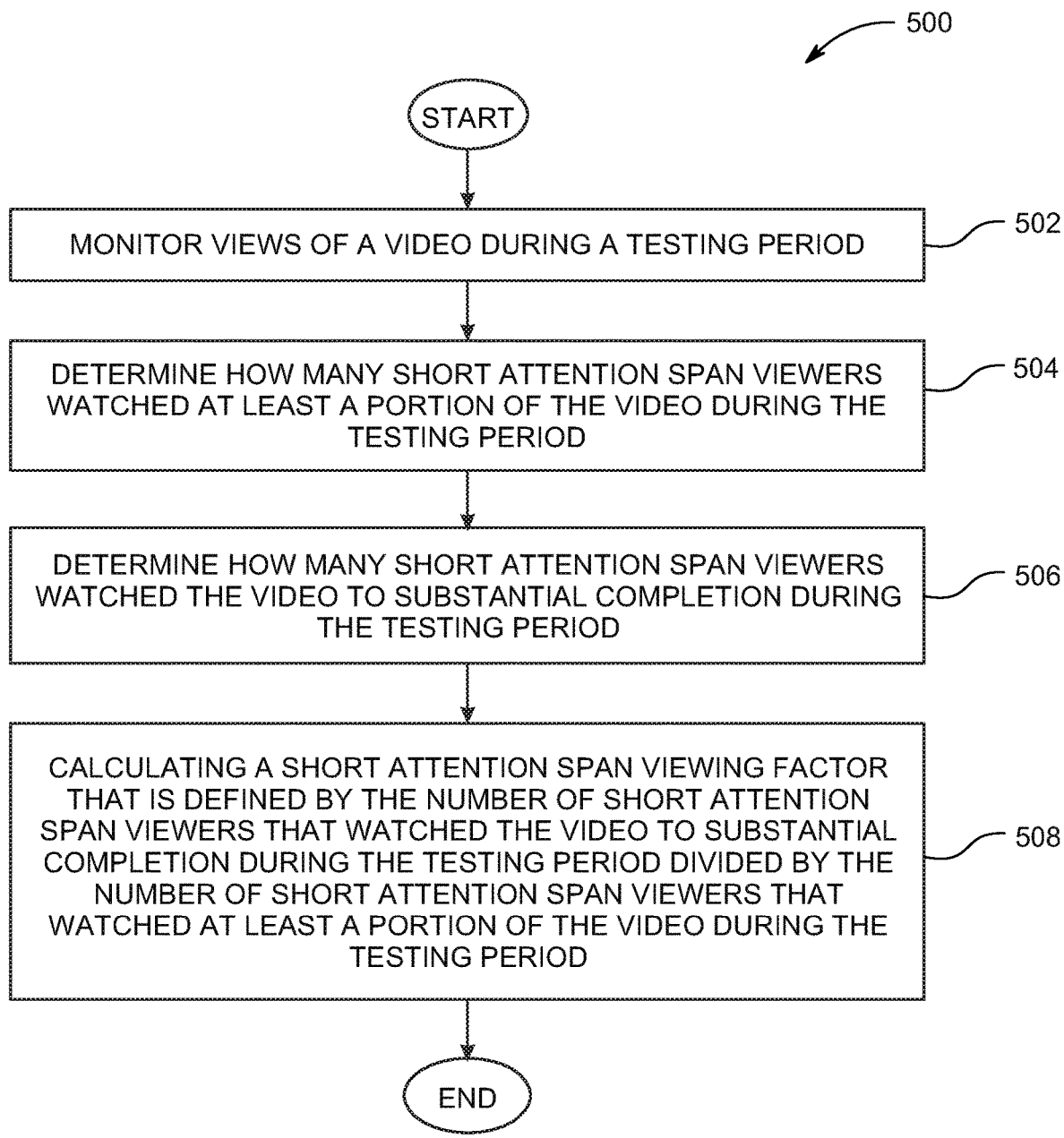
FIG. 5 is a flowchart illustrating steps of a method of calculating a second viewing factor for a video that can be used to help generate a content score for the video.

FIG. 5 illustrates steps of a method of calculating a short attention span viewing factor. The method 500 begins and proceeds to step 502, where views of the video during the testing period are monitored. Here again, this step can be done in parallel with the monitoring step 302 of the method illustrated in FIG. 3. In this instance, however, we are only paying attention to the viewing behavior of short attention span viewers.

In step 504, the number of short attention span viewers that watched at least a portion of the video during the testing period is determined. In step 506, the number of short attention span viewers that watched substantially all of the video during the testing period is determined. In step 508, a short attention span viewing factor is determined. The short attention span viewing factor is defined as the number of short attention span viewers that watched substantially all of the video during the testing period divided by the number of short attention span viewers that watched at least a portion of the video during the testing period. The method then ends.

If short attention span viewers watched substantially all of the video, this can indicate that the video is particularly interesting or engaging. As a result, a high value for the short attention span viewing factor can be used to adjust the content score for the video upward.

In the methods illustrated in FIGS. 4 and 5, the behavior of only a portion of all viewers is used to calculate the viewing factor. For the method illustrated in FIG. 4, the behavior of only long attention span viewers is used. In the method illustrated in FIG. 5, the behavior of only short attention span viewers is used. Also, there is no attempt to make any sort of fine adjustments for the actual demonstrated attention span of individual viewers.

Figure 6:
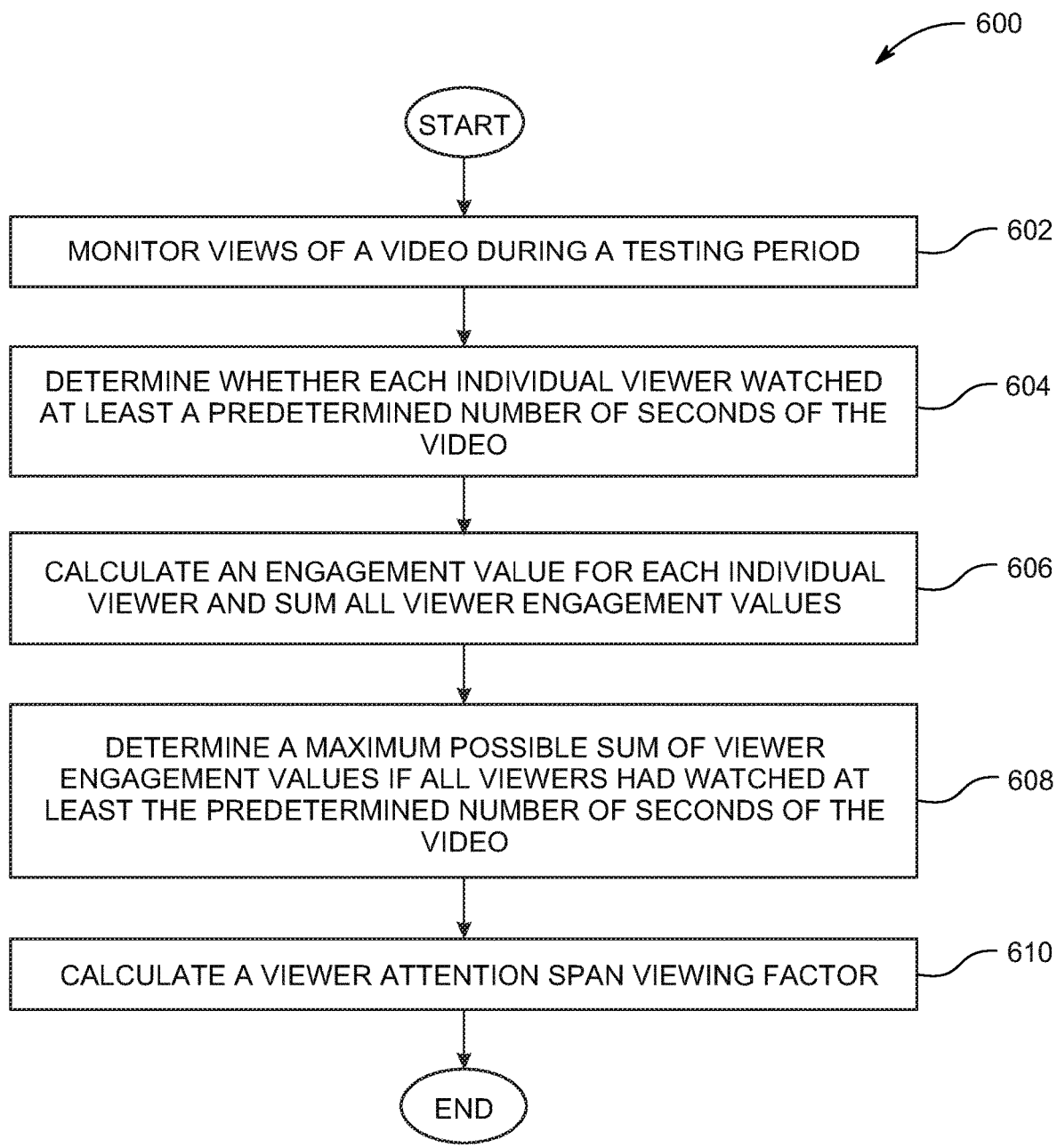
FIG. 6 is a flowchart illustrating steps of a method of calculating a third viewing factor for a video that can be used to help generate a content score for the video.

Another way of calculating an attention span-based viewing factor that takes into account the actual attention spans of individual viewers is illustrated in FIG. 6. In this method, behavior of all viewers is used to calculate the viewing factor.

The method 600 begins and proceeds to step 602 where views of a video are monitored during a testing period. In step 604, the viewing behavior of each viewer is checked to determine whether the viewer watched at least a predetermined number of seconds of the video.

In step 606, an engagement value is calculated for each individual viewer. Each viewer's engagement could be calculated in various different ways. However, in each formulation, the viewer's attention span is taken into account in determining the engagement value.

In some embodiments, a viewer's engagement value is based on two things: (1) an attention span value that represents the viewer's attention span, as determined from monitoring the viewer's viewing habits over time; and (2) a viewing value that indicates whether the viewer watched at least the predetermined number of seconds of the video being tested, as determined in step 604.

The viewer's attention value can represent how often the viewer watches at least a predetermined number of seconds of a video when watching videos. For example, if a viewer watched at least the predetermined number of seconds for only 25% of all the videos he has watched in the past, the viewer will have an attention span value of 0.25. If the viewer watched the predetermined number of seconds for 75% of all the videos he has watched in the past, the viewer's attention span value would be 0.75. Note, the predetermined number of seconds used to determine a viewer's attention span value is not necessarily the same predetermined number of seconds that is used in step 604 when determining whether the viewer watched at least the predetermined number of seconds of the video being tested.

A viewer's attention span value could also be determined in other ways. It need not be based on how often a viewer watches a predetermined number of seconds of videos. Instead, it could be based on the average number of seconds that a viewer spends watching videos, or it could be based on some other factor or factors. However, for purposes of this calculation, a viewer's attention span value would be a number between 0 and 1, and the larger the number, the greater the viewer's attention span.

A viewer's viewing value is either a 1 or a 0. If the viewer watched at least the predetermined number of seconds of the video, the viewer's viewing value is 1. If the viewer did not watch at least the predetermined number of seconds of the video, the viewer's viewing value is 0.

In step 606, viewing factors unit 142 calculates an engagement value "E" for each viewer based on the viewer's attention span value, confidence value and viewing value using the following equation:

$$E = \text{viewing value} - \text{attention span value}$$

A viewer's engagement value E could be positive or negative. A positive value indicates the video was engaging to viewers, and a negative value indicates the video was not particularly engaging to viewers. The engagement values for all viewers are then summed at the end of step 606 to generate a total engagement value for all viewers.

In another embodiment, a viewer's engagement value could also take into account a confidence value, that represents how confident we are that the viewer's attention span value is accurate. In this embodiment, a viewer's engagement value is based on three things: (1) an attention span value; (2) a viewing value that indicates whether the viewer watched at least the predetermined number of seconds of the video being tested, as determined in step 604; and (3) a confidence value that represents how confident we are that viewer's attention span value is accurate.

One value that could be used as the confidence value is the standard error in the viewer's attention span value. The confidence value could be determined in other ways. However, the smaller the confidence value, the greater the degree of confidence that the viewer's attention span is accurate. The larger the confidence value, the smaller the degree of confidence that the viewer's attention span value is accurate.

When a confidence value is also used to calculate a viewer's engagement value, in step 606 the viewing factors unit 142 calculates an engagement value "E" for each viewer using the following equation:

$$E = (\text{viewing value} - \text{attention span value}) / \text{confidence value}$$

In step 608, a maximum possible total engagement value for all viewers is determined. This essentially involves running the same calculation as in step 606, but assuming that all viewers had a viewing value of 1, indicating that all viewers watched at least the predetermined number of seconds of the video.

Finally, in step 610 a viewer attention span viewing factor is calculated, which is the total engagement value for all viewers calculated in step 606, divided by the maximum possible total engagement value determined in step 608.

In the method described above, a viewer's attention span is taken into account in generating an engagement value for the viewer. This assumes that the ratings and recommendation service 130 has information about each viewer's attention span, which is not always the case. A new viewer will not have viewed a sufficiently large number of videos for the ratings and recommendation service 130 to have determined the new viewer's attention span with a high degree of accuracy. For this reason, in the method described above, if the ratings and recommendation service 130 has little or no data on a viewer's attention span, data from that viewer will not be used to generate the attention span viewing factor.

Figure 7:
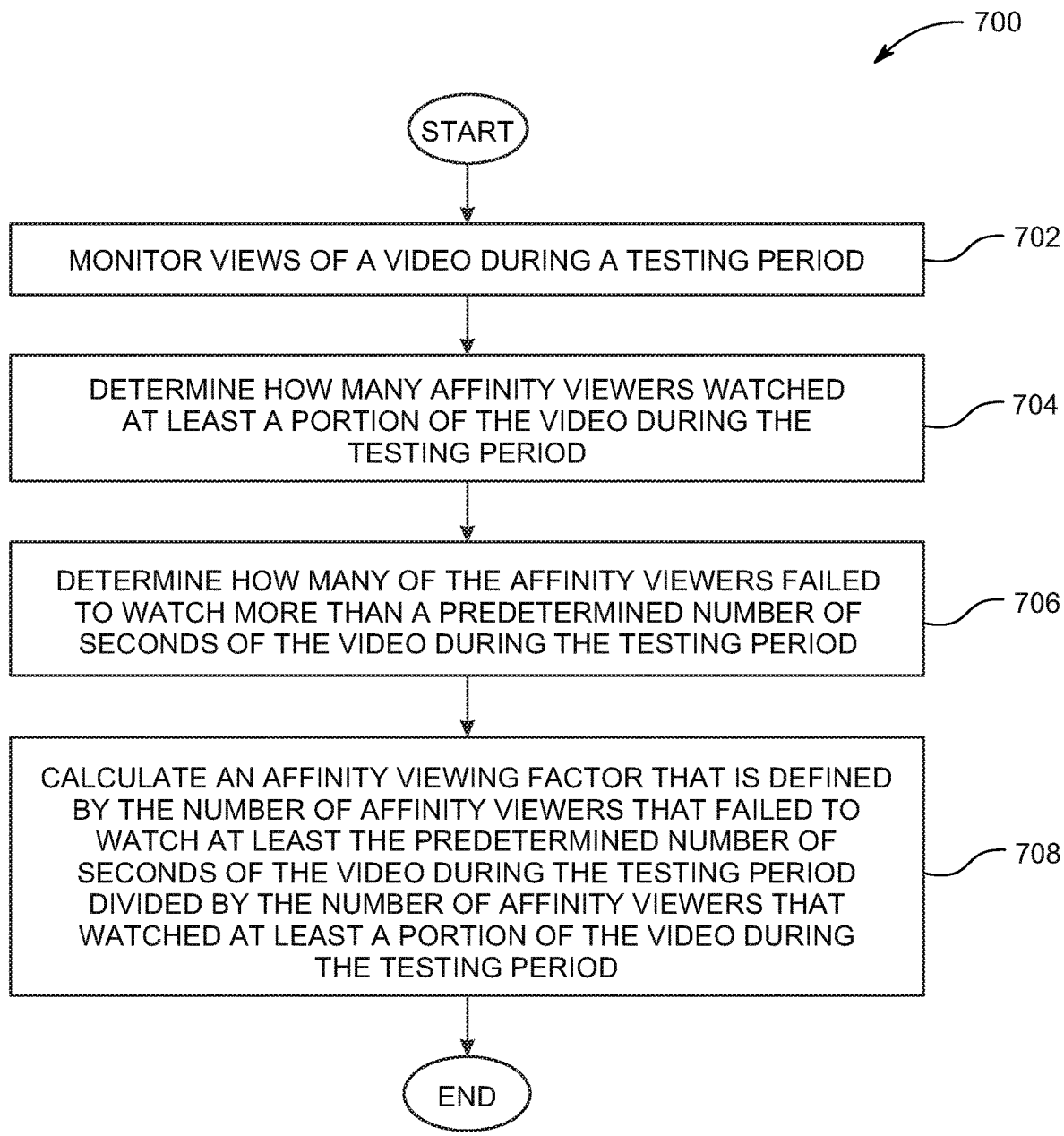
FIG. 7 is a flowchart illustrating steps of a method of calculating a fourth viewing factor for a video that can be used to help generate a content score for the video.

FIG. 7 illustrates steps of a method of calculating an affinity viewing factor. The method 700 begins and proceeds to step 702 where information about viewing behavior of viewers that watch the video is collected during the testing period. In this instance, we are only paying attention of the viewing behavior of affinity viewers.

The viewing behavior of an individual viewer will tend to indicate the viewer is interested in one or more topics or subjects. For example, a first viewer may routinely watch videos that relate to sports, whereas a second viewer routinely watches nature videos. Information about the subjects or topics of videos that each viewer typically watches is collected over time and used to identify the viewers' topics and subjects of interest. This information is stored in the viewer information databases 136.

An affinity viewer is someone who has demonstrated an interest in the subject or topic of the video being tested. In the method illustrated in FIG. 7, in step 704, the number of affinity viewers that watch at least a portion of the video during the testing period is determined. In step 706, the number of affinity viewers that failed to watch a predetermined number of seconds of the video during the testing period is determined. The predetermined number of seconds used in this method could be the same as the predetermined number of seconds used in the method illustrated in FIG. 3, or this number could be different.

In step 708, an affinity viewing factor is calculated. The affinity viewing factor is the number of affinity viewers that failed to watch the predetermined number of seconds of the video during the testing period, divided by the number of affinity viewers that watched at least a portion of the video during the testing period. If the number of affinity viewers that failed to watch at least the predetermined number of seconds of the video during the testing period is relatively high, this would tend to indicate that the video is not particularly interesting or engaging, even to viewers that have an affinity for the subject or topic of the video. Thus, a high affinity viewing factor will cause the content score to be adjusted downward.

Figure 8:
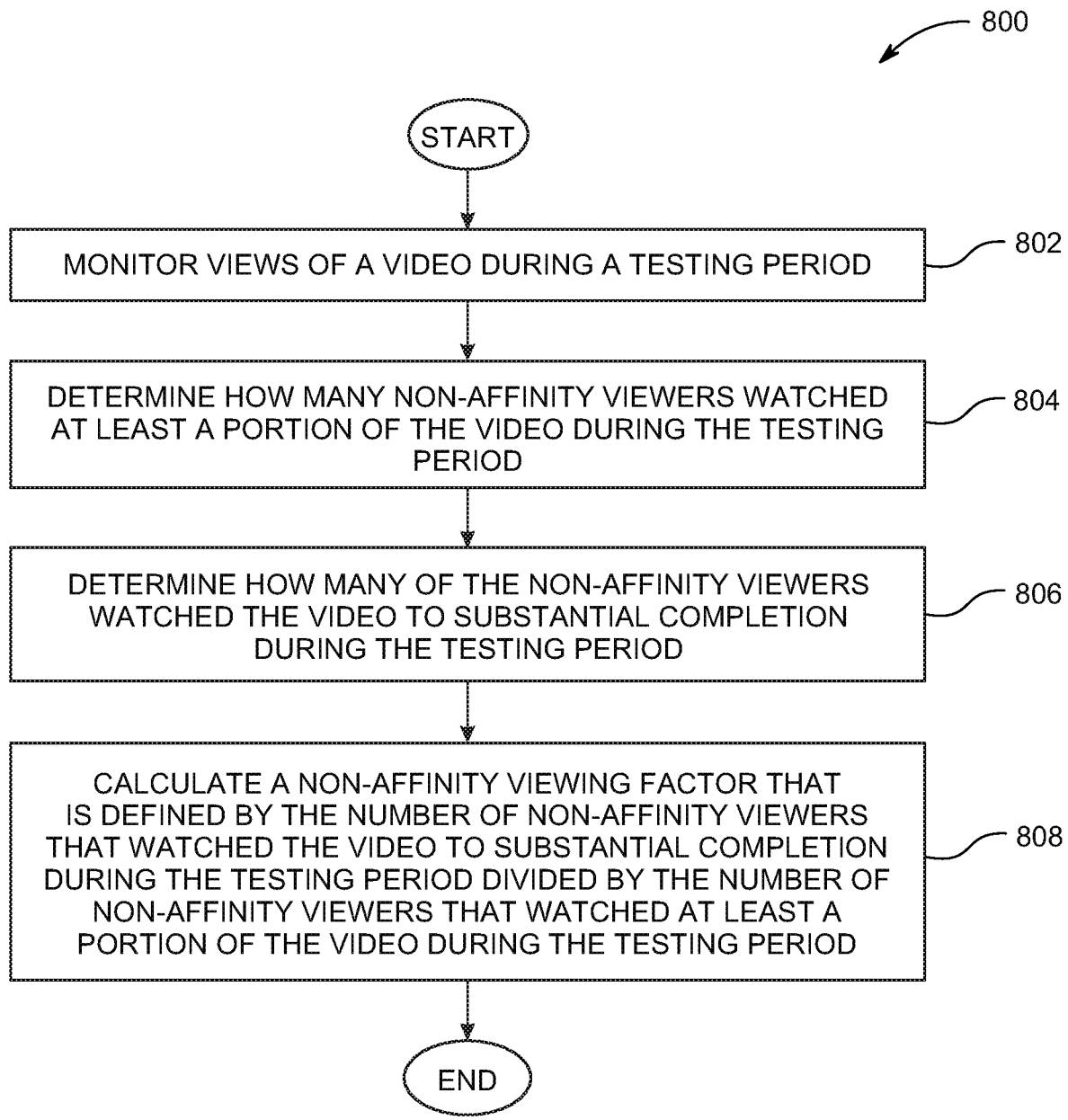
FIG. 8 is a flowchart illustrating steps of a method of calculating a fifth viewing factor for a video that can be used to help generate a content score for the video.

FIG. 8 illustrates steps of a method of calculating a non-affinity viewing factor. The method 800 begins and proceeds to step 802 where information about viewing behavior of viewers that watch the video is collected during the testing period. In this instance, we are only paying attention of the viewing behavior of non-affinity viewers. Non-affinity viewers are those viewers that have demonstrated they are not particularly interested in the subject or topic of the video.

In step 804, the number of non-affinity viewers that watch at least a portion of the video during the testing period is determined. In step 806, the number of non-affinity viewers that watched substantially all of the video during the testing period is determined. In step 808, a non-affinity viewing factor is calculated. The non-affinity viewing factor is the number of non-affinity viewers that watched substantially all of the video during the testing period, divided by the number of non-affinity viewers that watched at least a portion of the video during the testing period.

If the number of non-affinity viewers that watched substantially all of the video during the testing period is relatively high, this would tend to indicate that the video is particularly interesting or engaging, even to viewers that are not typically interested in the subject or topic of the video. Thus, a high non-affinity viewing factor is used to adjust the content score upward.

Figure 9:
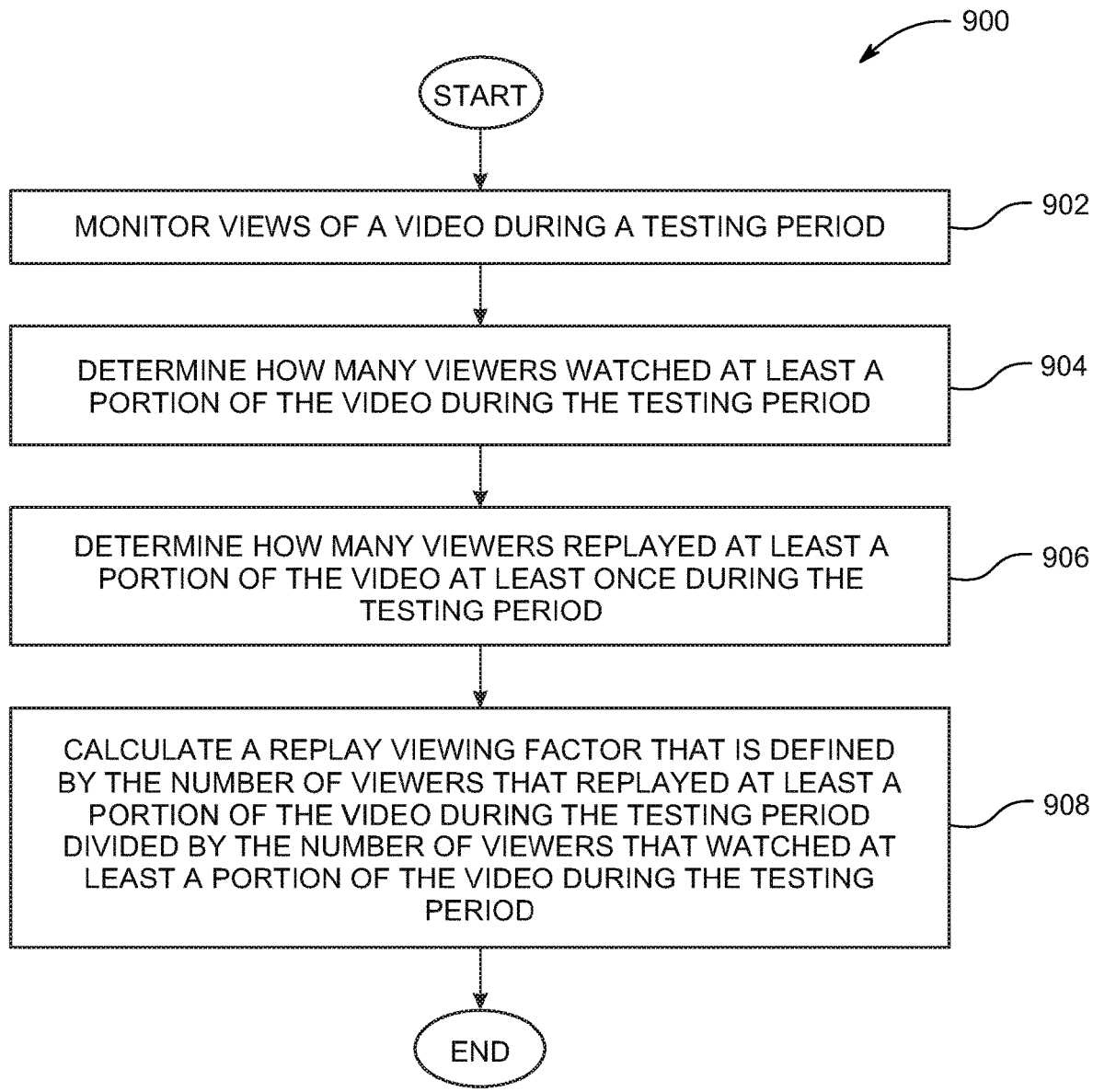
FIG. 9 is a flowchart illustrating steps of a method of calculating a sixth viewing factor for a video that can be used to help generate a content score for the video.

FIG. 9 illustrates steps of a method of calculating a replay viewing factor. The method 900 begins and proceeds to step 902 where views of the video during the testing period are monitored. In this instance, we are looking for instances where individual viewers replayed at least a portion of the video during the testing period.

In step 904, the number of viewers that watched at least a portion of the video during the testing period is determined. In step 906, the number of viewers that replayed at least a portion of the video at least one time during the testing period is determined. In step 908, a replay viewing factor is determined. The replay viewing factor is defined as the number of viewers that replayed at least a portion of the video during the testing period divided by the number of viewers that watched at least a portion of the video during the testing period.

If a significant number of viewers replay at least a portion of the video, this tends to indicate that the video was particularly interesting or engaging to viewers. Thus, a high replay viewing factor is used to adjust the content score upward.

Other viewing factors beyond those discussed above may also be used to calculate the final content score for a video. For example, another aspect which could be taken into consideration is the "view rate" which is defined as the number of viewers that actually played at least a portion of the video during the testing period divided by the number of viewers that were presented with the option of playing the video during the testing period.

Another aspect that may be taken into consideration is how the video was presented to viewers on the webpage. If a video is the fifth choice of a number of available videos, but many viewers played the video before playing choices one through four, this tends to indicate that the video appears interesting to viewers. Thus, this could argue in favor of a higher content score for the video.

It also may be necessary to filter out some viewer behavior before performing the methods discussed above. For example, it may be helpful to ignore instances where the video player was extremely small on the viewers' screen or where the sound was turned off during play of the video, as these views may not be representative of the true engagement factor of the video.

The present invention may be embodied in methods, apparatus, electronic devices, and/or computer program products. Accordingly, the invention may be embodied in hardware and/or in software (including firmware, resident software, micro-code, and the like), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus or device. More specific examples (a non-exhaustive list) of the computer-readable medium include the following: hard disks, optical storage devices, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object-oriented programming language, such as JavaScript, Java®, Swift or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Figure 10:
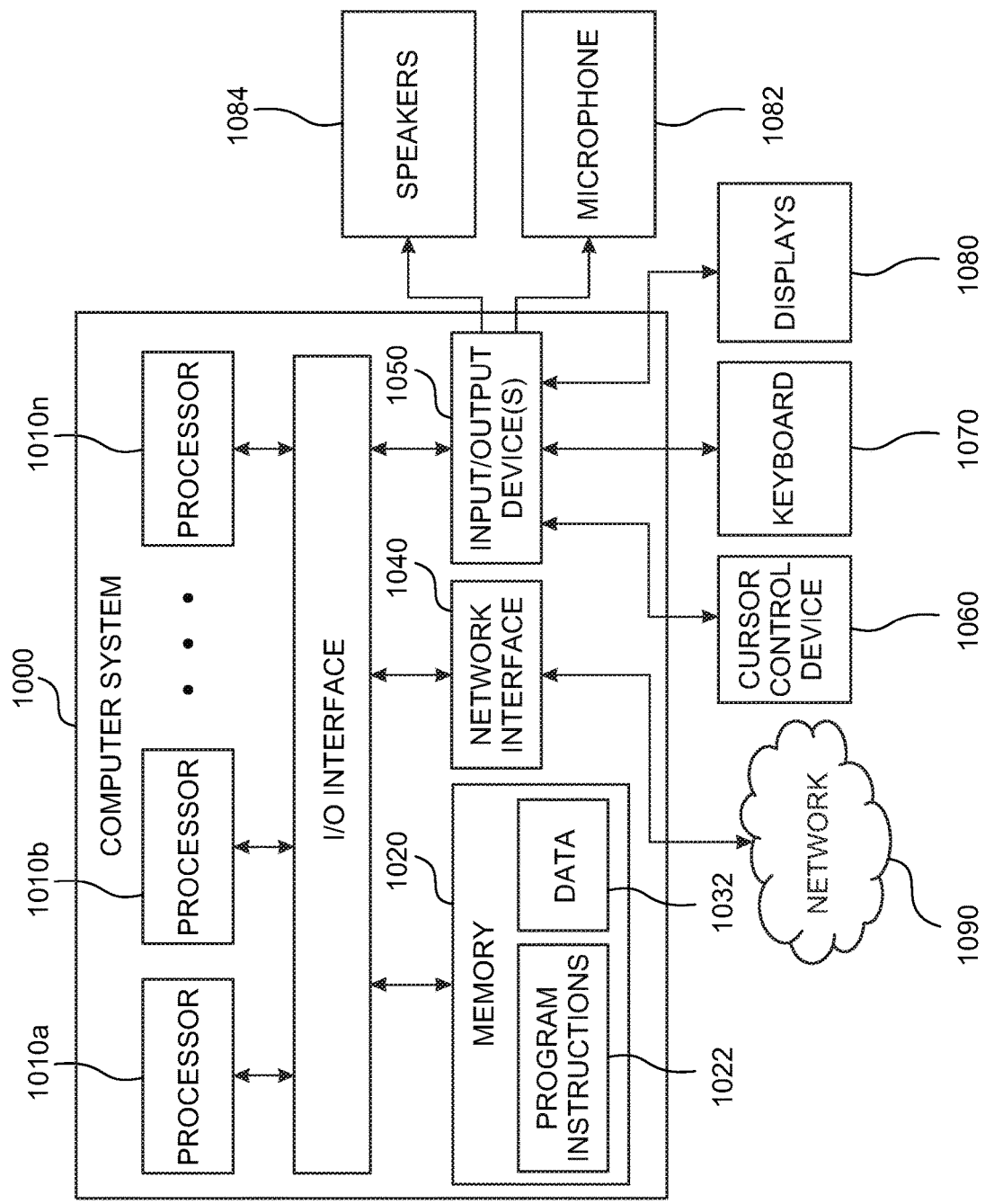
FIG. 10 is a diagram illustrating elements of a computer system and associated peripherals which could embody various aspects of the invention.

FIG. 10 depicts a computer system 1000 that can be utilized in various embodiments of the present invention to implement the invention according to one or more embodiments. The various embodiments as described herein may be executed on one or more computer systems, which may interact with various other devices. One such computer system is the computer system 1000 illustrated in FIG. 10. The computer system 1000 may be configured to implement the methods described above. The computer system 1000 may be used to implement any other system, device, element, functionality or method of the above-described embodiments. In the illustrated embodiments, the computer system 1000 may be configured to implement the disclosed methods as processor-executable executable program instructions 1022 (e.g., program instructions executable by processor(s) 1010) in various embodiments.

In the illustrated embodiment, computer system 1000 includes one or more processors 1010*a*-1010*n* coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, display(s) 1080, microphone 1082 and speakers 1084. In various embodiments, any of the components may be utilized by the system to receive user input described above. In various embodiments, a user interface may be generated and displayed on display 1080. In some cases, it is contemplated that embodiments may be implemented using a single instance of computer system 1000, while in other embodiments multiple such systems, or multiple nodes making up computer system 1000, may be configured to host different portions or instances of various embodiments. For example, in one embodiment some elements may be implemented via one or more nodes of computer system 1000 that are distinct from those nodes implementing other elements. In another example, multiple nodes may implement computer system 1000 in a distributed manner.

In different embodiments, the computer system 1000 may be any of various types of devices, including, but not limited to, a personal computer system, desktop computer, laptop, notebook, or netbook computer, a portable computing device, a mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, the computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments processors 1010 may be general-purpose or embedded processors implementing any of a variety of instruction set architectures (ISAs). In multiprocessor systems, each of processors 1010 may commonly, but not necessarily, implement the same ISA.

System memory 1020 may be configured to store program instructions 1022 and/or data 1032 accessible by processor 1010. In various embodiments, system memory 1020 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 1020. In other embodiments, program instructions and/or data may be received, sent or stored upon different types of computer-accessible media or on similar media separate from system memory 1020 or computer system 1000.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network (e.g., network 1090), such as one or more external systems or between nodes of computer system 1000. In various embodiments, network 1090 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or accessing data by one or more computer systems 1000. Multiple input/output devices 1050 may be present in computer system 1000 or may be distributed on various nodes of computer system 10000. In some embodiments, similar input/output devices may be separate from computer system 1000 and may interact with one or more nodes of computer system 1000 through a wired or wireless connection, such as over network interface 1040.

In some embodiments, the illustrated computer system may implement any of the operations and methods described above, such as the methods illustrated by the flowcharts of FIGS. 3-9. In other embodiments, different elements and data may be included.

Those skilled in the art will appreciate that the computer system 1000 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 1000 may also be connected to other devices that are not illustrated, or instead ay operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of generating a content score for a video that is indicative of how engaging the video is likely to be to viewers, comprising:
   determining, with at least one processor, the total number of viewers that watched at least a portion of the video during a testing period, wherein at least some viewers are affinity viewers that have an affinity for the topic of the video;
   determining, with the at least one processor, how many affinity viewers watched the video during the testing period;
   determining, with the at least one processor, the total number of viewers that watched at least a predetermined number of seconds of the video or watched the video to substantial completion during the testing period;
   determining, with the at least one processor, how many of the affinity viewers failed to watch the predetermined number of seconds of the video during the testing period;
   calculating, with the at least one processor, an affinity viewing factor that is defined as the number of affinity viewers that failed to watch more than the predetermined number of seconds of the video during the testing period divided by the number of affinity viewers that watched at least a portion of the video during the testing period; and
   generating, with the at least one processor, a content score for the video where the greater the value of the content score, the more engaging the video is believed to be, and wherein the content score is based, at least in part, on the affinity viewing factor and a completion rate, the completion rate being defined as the total number of viewers that watched at least then predetermined number of seconds of the video or watched the video to substantial completion during the testing period divided by the total number of viewers that watched at least a portion of the video during the testing period, where the greater the value of the completion rate, the more the value of the content score is increased, and where the greater the value of the affinity viewing factor, the more the value of the content score is decreased.

2. The method of claim 1, wherein when the video is 30 seconds in duration or less, the predetermined number of seconds is 30 seconds, and the completion rate is defined as the total number of viewers that watched the video to substantial completion during the testing period divided by the total number of viewers that watched at least a portion of the video during the testing period.

3. The method of claim 1, wherein when the video is longer than 30 seconds in duration, the predetermined number of seconds is 30 seconds, and the completion rate is defined as the total number of viewers that watched at least 30 seconds of the video during the testing period divided by the total number of viewers that watched at least a portion of the video during the testing period.

4. The method of claim 1, wherein at least some of the viewers are long attention span viewers that tend to watch videos to substantial completion, and wherein the method further comprises:
   determining, with the at least one processor, how many of the long attention span viewers watched at least a portion of the video during the testing period;
   determining, with the at least one processor, how many of the long attention span viewers failed to watch more than the predetermined number of seconds of the video during the testing period; and
   calculating, with the at least one processor, a long attention span viewing factor that is defined by the number of long attention span viewers that failed to watch more than the predetermined number of seconds of the video during the testing period divided by the number of long attention span viewers that watched at least a portion of the video during the testing period;
   wherein the content score is also based on the long attention span viewing factor, and wherein the greater the value of the long attention span viewing factor, the more the value of the content score is decreased.

5. The method of claim 1, wherein at least some of the viewers are short attention span viewers that do not tend to watch videos to substantial completion, wherein the method further comprises:
   determining, with the at least one processor, how many of the short attention span viewers watched at least a portion of the video during the testing period;
   determining, with the at least one processor, how many of the short attention span viewers watched the video to substantial completion during the testing period; and
   calculating, with the at least one processor, a short attention span viewing factor that is defined as the number of short attention span viewers that watched the video to substantial completion during the testing period divided by the number of short attention span viewers that watched at least a portion of the video during the testing period;
   wherein the content score is also based on the short attention span viewing factor, and wherein the greater the value of the short attention span viewing factor, the more the value of the content score is increased.

6. The method of claim 1, wherein the method further comprises:
   Determining, with the at least one processor, how many of the viewers watched at least a portion of the video during the testing period;
   Determining, with the at least one processor, how many of the viewers watched at least a predetermined number of seconds of the video during the testing period;
   calculating, with the at least one processor, for each viewer that watched at least a portion of the video during the testing period, an engagement value that is based on whether the viewer watched at least the predetermined number of seconds of the video and an attention span value that is indicative of the viewer's attention span;

summing, with the at least one processor, all of the viewer engagement values to create an actual sum of viewer engagement values;

wherein the content score is also based on the actual sum of the viewer engagement values, and wherein the greater the value of the actual sum of the viewer engagement values, the more the value of the content score increases.

7. The method of claim 6, further comprising:

determining, with the at least one processor, a maximum possible sum of the viewer engagement values that would result if all viewers that watched at least a portion of the video during the testing period had watched at least the predetermined number of seconds of the video; and calculating, with the at least one processor, an attention span viewing factor that comprises the actual sum of the viewer engagement values divided by the maximum possible sum of the viewer engagement values;

wherein the content score is also based on the attention span viewing factor, and wherein the greater the value of the attention span viewing factor, the more the value of the content score increases.

8. The method of claim 7, wherein each viewer's engagement value is also based on a confidence value that represents a level of confidence that the viewer's attention span value is accurate.

9. The method of claim 1, wherein at least some of the viewers are non-affinity viewers that do not have an affinity for the topic of the video, wherein the method further comprises:

determining, with the at least one processor, how many non-affinity viewers watched the video during the testing period;

determining, with the at least one processor, how many of the non-affinity viewers watched at least the predetermined number of seconds of the video or watched the video to substantial completion during the testing period; and calculating, with the at least one processor, a non-affinity viewing factor that is defined as the number of non-affinity viewers that watched at least the predetermined number of seconds of the video or watched the video to substantial completion during the testing period divided by the number of non-affinity viewers that watched at least a portion of the video during the testing period;

wherein the content score is also based on the non-affinity viewing factor, and wherein the greater the value of the non-affinity viewing factor, the more the value of the content score is increased.

10. The method of claim 1, wherein the method further comprises:

determining, with the at least one processor, how many viewers replayed at least a predetermined number of seconds of the video at least once during the testing period, and calculating, with the at least one processor, a replay viewing factor that is defined as the number of viewers that replayed at least the predetermined number of seconds of the video at least once during the testing period divided by the number of viewers that watched at least a portion of the video during the testing period;

wherein the content score is also based on the replay viewing factor, and wherein the greater the value of the replay factor, the more the value of the content score is increased.

11. A system for generating a content score for a video that is indicative of how engaging the video is likely to be to viewers, comprising:

a data acquisition unit comprising at least one processor that determines:

the total number of viewers that watched at least a portion of the video during a testing period, where at least some of the viewers are affinity viewers that have an affinity for the tropic of the video;

the total number of viewers that watched at least a predetermined number of seconds of the video or watched the video to substantial completion during the testing period;

how many affinity viewers watched the video during the testing period;

how many of the affinity viewers failed to watch more than the predetermined number of seconds of the video during the testing period;

a viewing factors unit comprising at least one processor that calculates an affinity viewing factor by dividing the number of affinity viewers that failed to watch more than the predetermined number of seconds of the video during the testing period by the number of affinity viewers that watched at least a portion of the video during the testing period; and a content score unit comprising at least one processor that generates a content score for the video where the greater the value of the content score, the more engaging the video is believed to be, and wherein the content score is based, at least in part, on the affinity viewing factor and a completion rate, the completion rate being defined as the total number of viewers that watched at least the predetermined number of seconds of the video or watched the video to substantial completion during the testing period divided by the total number of viewers that watched at least a portion of the video during the testing period, where the greater the value of the completion rate, the more the value of the content score is increased, and where the greater the value of the affinity viewing factor, the more the value of the content score is decreased.

12. The system of claim 11, wherein when the video is 30 seconds in duration or less, the predetermined number of seconds is 30 seconds, and the completion rate is defined as the total number of viewers that watched the video to substantial completion during the testing period divided by the total number of viewers that watched at least a portion of the video during the testing period.

13. The system of claim 11, wherein when the video is longer than 30 seconds in duration, the predetermined number of seconds is 30 seconds, and the completion rate is defined as the total number of viewers that watched at least 30 seconds of the video during the testing period divided by the total number of viewers that watched at least a portion of the video during the testing period.

14. The system of claim 11, wherein at least some of the viewers are long attention span viewers that tend to watch videos to substantial completion, and wherein the viewing factors unit calculates a long attention span viewing factor by:

determining how many of the long attention span viewers watched at least a portion of the video during the testing period;

determining how many of the long attention span viewers failed to watch more than predetermined number of seconds of the video during the testing period; and calculating the long attention span viewing factor by dividing the number of long attention span viewers that failed to watch more than the predetermined number of seconds of the video during the testing period by the number of long attention span viewers that watched at least a portion of the video during the testing period;

wherein the content score is also based on the long attention span viewing factor, and wherein the greater the value of the long attention span viewing factor, the more the value of the content score is decreased.

15. The system of claim 11, wherein at least some of the viewers are short attention span viewers that do not tend to watch videos to substantial completion, and wherein the viewing factors unit calculates a short attention span viewing factor by:

determining how many of the short attention span viewers watched at least a portion of the video during the testing period;

determining how many of the short attention span viewers watched the video to substantial completion during the testing period; and calculating the short attention span viewing factor by dividing the number of short attention span viewers that watched the video to substantial completion during the testing period by the number of short attention span viewers that watched at least a portion of the video during the testing period;

wherein the content score is also based on the short attention span viewing factor, and wherein the greater the value of the short attention span viewing factor, the more the value of the content score is increased.

16. The system of claim 11, wherein the viewing factors unit calculates an attention span viewing factor by:

determining how many of the viewers watched at least a portion of the video during the testing period;

determining how many of the viewers watched at least predetermined number of seconds of the video during the testing period;

calculating, for each viewer that watched at least a portion of the video during the testing period, an engagement value that is based on whether the viewer watched at least the predetermined number of seconds of the video and an attention span value that is indicative of the viewer's attention span;

summing all of the viewer engagement values to create an actual sum of viewer engagement values; and calculating an attention span viewing factor that is based on the sum of all the viewer engagement values, wherein the content score is also based on the attention span viewing factor, and wherein the greater the value of the attention span viewing factor, the more the value of the content score is increased.

17. The system of claim 16, wherein the viewing factors unit also determines a maximum possible sum of the viewer engagement values that would result if all viewers that watched at least a portion of the video during the testing period had watched at least the predetermined number of seconds of the video, and wherein the attention span viewing factor is calculated by dividing the actual sum of the viewer engagement values by the maximum possible sum of the viewer engagement values.

18. The system of claim 17, wherein each viewer's engagement value is also based on a confidence value that represents a level of confidence that the viewer's attention span value is accurate.

19. The system of claim 11, wherein at least some of the viewers are non-affinity viewers that do not have an affinity for the topic of the video, and wherein the viewing factors unit calculates a non-affinity viewing factor by:

determining how many non-affinity viewers watched the video during the testing period;

determining how many of the non-affinity viewers watched at least the predetermined number of seconds of the video or watched the video to substantial completion during the testing period; and calculating the non-affinity viewing factor by dividing the number of non-affinity viewers that watched at least the predetermined number of seconds of the video or watched the video to substantial completion during the testing period by the number of non-affinity viewers that watched at least a portion of the video during the testing period;

wherein the content score is also based on the non-affinity viewing factor, and wherein the greater the value of the non-affinity viewing factor, the more the value of the content score is increased.

20. The system of claim 11, wherein the viewing factors unit calculates a replay viewing factor by:

determining how many viewers replayed at least a predetermined number of seconds of the video at least once during the testing period, and calculating the replay viewing factor by dividing the number of viewers that replayed at least the predetermined number of seconds of the video at least once during the testing period by the number of viewers that watched at least a portion of the video during the testing period;

wherein the content score is also based on the replay viewing factor, and wherein the greater the value of the replay factor, the more the value of the content score is increased.

21. A method of generating a content score for a video that is indicative of how engaging the video is likely to be to viewers, comprising:

determining, with at least one processor, the total number of viewers that watched at least a portion of the video during a testing period, where at least some of the viewers are non-affinity viewers that do not have an affinity for the topic of the video;

determining, with the at least one processor, how many non-affinity viewers watched at least a portion of the video during the testing period;

determining, with the at least one processor, the total number of viewers that watched at least a predetermined number of seconds of the video or watched the video to substantial completion during the testing period;

determining, with the at least one processor, how many of the non-affinity viewers watched at least the predetermined number of seconds of the video or watched the video to substantial completion during the testing period;

calculating, with the at least one processor, a non-affinity viewing factor that is defined as the number of non-affinity viewers that watched at least the predetermined number of seconds of the video or watched the video to substantial completion during the testing period divided by the number of non-affinity viewers that watched at least a portion of the video during the testing period; and generating, with the at least one processor, a content score for the video where the greater the value of the content score, the more engaging the video is believed to be, and wherein the content score is based, at least in part, on the non-affinity viewing factor and a completion rate that is defined as the total number of viewers that watched at least a predetermined number of seconds of the video or watched the video to substantial completion during the testing period divided by the total number of viewers that watched at least a portion of the video during the testing period, where the greater the value of the completion rate, the more the value of the content score is increased, and where the greater the value of the non-affinity viewing factor, the more the value of the content score increases.

22. A system for generating a content score for a video that is indicative of how engaging the video is likely to be to viewers, comprising:
   a data acquisition unit comprising at least one processor that determines:
      the total number of viewers that watched at least a portion of the video during a testing period, where at least some of the viewers are non-affinity viewers that do not have an affinity for the topic of the video;
      the total number of viewers that watched at least a predetermined number of seconds of the video or watched the video to substantial completion during the testing period;
      the number of non-affinity viewers that watched the video during the testing period;
      the number of non-affinity viewers that watched at least the predetermined number of seconds of the video or watched the video to substantial completion;
   a viewing factors unit comprising at least one processor that calculates a non-affinity viewing factor by dividing the number of non-affinity viewers that watched at least a predetermined number of seconds of the video or watched the video to substantial completion during the testing period by the number of non-affinity viewers that watched at least a portion of the video during the testing period; and
   a content score unit comprising at least one processor that generates a content score for the video where the greater the value of the content score, the more engaging the video is believed to be, and wherein the content score is based, at least in part, on the non-affinity viewing factor and a completion rate, where the completion rate is defined as the total number of viewers that watched at least a predetermined number of seconds of the video or watched the video to substantial completion during the testing period divided by the total number of viewers that watched at least a portion of the video during the testing period, where the greater the value of the completion rate, the more the value of the content score is increased, and where the greater the value of the non-affinity viewing factor, the more the value of the content score is increased.

* * * * *